UNITED STATES PATENT OFFICE.

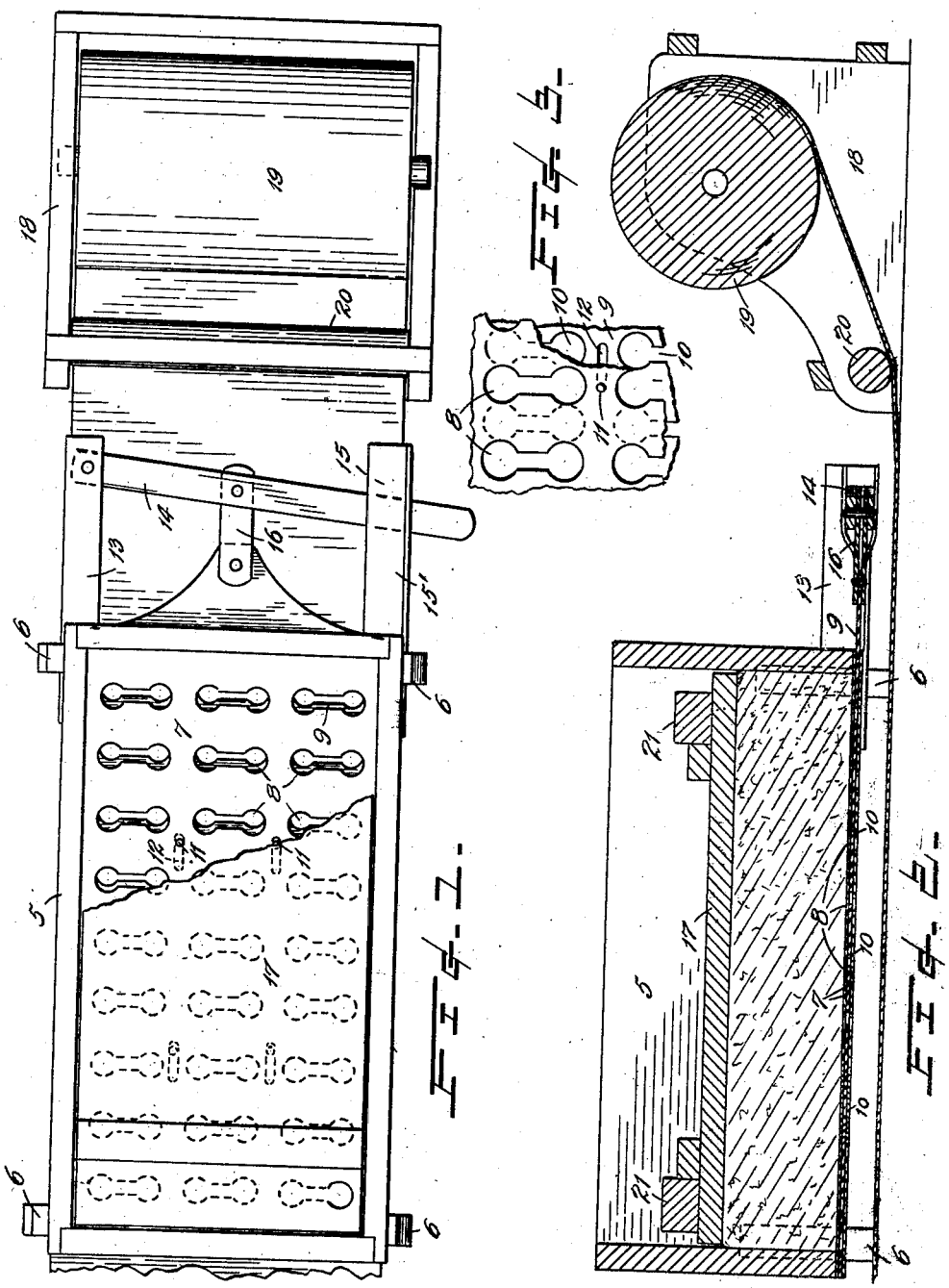

GUST F. SEVON AND OTTO JARVIMAKI, OF SEATTLE, WASHINGTON.

CAKE-DOUGH CUTTER.

No. 837,971.　　　　Specification of Letters Patent.　　　　Patented Dec. 11, 1906.

Application filed February 26, 1906. Serial No. 302,959.

*To all whom it may concern:*

Be it known that we, GUST F. SEVON, a subject of the Czar of Russia, and OTTO JARVIMAKI, a citizen of the United States, residing at Seattle, in the county of King and State of Washington, have invented certain new and useful Improvements in Cake-Dough Cutters, of which the following is a specification, reference being had therein to the accompanying drawings, in which—

Figure 1 is a plan view of devices embodying our invention. Fig. 2 is a vertical longitudinal section of the same, and Fig. 3 is a detail fragmentary view of the box-bottom and cutter-plate.

The invention relates to utensils for forming cookies or the like from cake-dough preparatory to their being baked; and its object is the provision of simple and conveniently-operated means whereby such operations may be performed with uniformity and despatch.

With these ends in view the invention consists in the novel construction, adaptation, and combination of parts, as will be hereinafter described, and pointed out in the appended claims.

In the drawings the reference-numeral 5 designates a receptacle or box having an open top for receiving the dough and is provided at its sides with legs 6 to support the same at a short distance above a table or other suitable platform. The box-bottom 7 is double—that is, made of two sheets of metal spaced at a short distance apart and perforated with a number of holes 8 of any desired shape and in a longitudinal direction. Those of each row are spaced at distances apart slightly greater than the distances across the respective holes. Slidingly fitted between the two said bottom parts is a cutter-plate 9, provided with holes 10 of the same sizes and shapes as those of the said bottom and so disposed as to register therewith when the plate is moved to the full extent of its travel toward the back end of the box. The bottom parts are firmly secured together and to the box along the back and side edges, and to prevent these bottom parts separating toward the middle of the box rivets 11 are provided, which pass through elongated apertures 12 of the said plate. Projecting from the front end of the box is a bracket-arm 13, to which is fulcrumed a lever 14, extending through a guide-slot 15 of another bracket-arm 15'. The protruding front end of the plate 9 is connected by a link 16 with the lever intermediate of the two aforesaid bracket-arms. A loosely-fitted board 17 is provided within the box for a follower.

Adjacent to the front end of the box is a stand 18, in which is rotatably mounted a roll of paper 19, from which the paper is unwound and caused to pass about a guide-roller 20, and thence beneath the box to receive the cut cakes as they are dropped from the box.

In operation the receptacle is partially filled with the mixed cake-dough and the follower placed thereabove. By manipulating the said lever the cutter-plate is retracted to present the holes thereof in registration with those of the box-bottom when the dough is forced through the holes by its weight and may be facilitated by the employment of weights 21 upon the follower. When sufficient of the dough has been thus forced out, the cutter-plate is moved outwardly and severs that which is exuded from the mixture within the box. The cakes are thereby formed and deposited upon the paper below and which after receiving a batch is drawn rearwardly to bring another portion into position for others, and so on. The paper after receiving the formed cakes is cut into lengths to be placed in a baking-pan for cooking.

Having described our invention, what we claim as new, and desire to secure by Letters Patent, is—

1. In apparatus of the class described, the combination of the receptacle provided with a double bottom having perforations therein, a slidable plate positioned between the parts of said double bottom and provided with perforations adapted to register with the perforations of the said bottom, a bracket secured to the end of the receptacle, a lever fulcrumed to the bracket, a connection between the lever and the said plate, a stand for a roll of paper, and a guide-roller in the stand.

2. In apparatus of the class described, the combination of the receptacle provided with a double bottom having perforations therein, a slidable plate positioned between the parts of said double bottom and provided with perforations adapted to register with the perforations of the said bottom, a bracket secured to the end of the receptacle, a lever fulcrumed to the bracket, a connection between the lever and the said plate, a follower in said receptacle, a stand for a roll of paper, and a guide-roller in the stand.

In testimony whereof we affix our signatures in presence of two witnesses.

GUST F. SEVON.
OTTO JARVIMAKI.

Witnesses:
PIERRE BARNES,
T. H. WARFORD.